United States Patent [19]

Sugiki et al.

[11] Patent Number: 4,606,018
[45] Date of Patent: Aug. 12, 1986

[54] OPTICAL RECORDING MEDIUM

[75] Inventors: Mikio Sugiki, Yokohama; Kenjiro Watanabe, Shin, both of Japan

[73] Assignee: Sony Corporation, Tokyo, Japan

[21] Appl. No.: 551,083

[22] Filed: Nov. 14, 1983

[30] Foreign Application Priority Data

Nov. 25, 1982 [JP] Japan ................................ 57-206494

[51] Int. Cl.$^4$ ............................................... G11B 7/24
[52] U.S. Cl. .................... 369/279; 369/109; 369/275; 369/44
[58] Field of Search ................. 369/44, 109, 111, 275, 369/279, 284, 288

[56] References Cited

U.S. PATENT DOCUMENTS

| | | | |
|---|---|---|---|
| 4,161,752 | 7/1979 | Basilico | 369/109 |
| 4,423,502 | 12/1983 | Dil | 369/275 |
| 4,481,620 | 11/1984 | Murakami | 369/275 |

FOREIGN PATENT DOCUMENTS 145535 11/1981 Japan .................................. 369/275

OTHER PUBLICATIONS

"Diffraction Theory of Laser Read-Out Systems for Optical Video Discs", by H. H. Hopkins, J. Opt. Soc. Am., vol. 69, No. 1, Jan. 1979, pp. 4–24.

Primary Examiner—Alan Faber
Attorney, Agent, or Firm—Hill, Van Santen, Steadman & Simpson

[57] ABSTRACT

A reflection-type optical recording medium which has a surface on which track guide grooves are formed and in which a layer of a recording material that has an increased energy reflection coefficient in a write portion. The track guide grooves are formed with a depth $\phi_0$ so that improved efficiency results because of the selection of various parameters of the system.

2 Claims, 14 Drawing Figures

DEPTH($\phi_0$) OF TRACK GUIDE GROOVES—READ SIGNAL AMOUNT H.F.(P-P)

OPTICAL RECORDING MEDIUM

BACKGROUND OF THE INVENTION

1. Field of the Invention

The present invention relates to a writable reflection-type optical recording medium in which a layer of a recording material which has a changed energy reflection coefficient at a write portion upon data write is formed on a surface on which track guide grooves are formed.

2. Description of the Prior Art

A writable reflection-type optical recording medium for a DRAW (direct read after write) system such as an optical recording disc is known in which various types of data (video or audio analog or digital data) are recorded thereon in the form of pits (holes) or reproduced therefrom by means of a light spot from a light source such as a semiconductor laser. In such an optical recording disc, the provision of track guide grooves for tracking during write operation is very important. If such track guide grooves are not formed, tracking during write operation becomes complex.

In an optical recording disc of melt type wherein data is written by forming pits (holes) in a thin tellurium-based film formed on a surface on which track guide grooves are formed, the depth of the track guide groove is set to be a value $\frac{1}{8}$ the wavelength of the read light, which value is optimal for tracking servo control by the push-pull method. An optical recording disc $D_0$ has, for example, a structure as shown in FIG. 1. More specifically, a thin recording layer 2 is deposited on one (bottom) surface $1a$ of a glass or acrylic resin substrate 1 on which track guide grooves $PG_0$ are formed. A resin layer 3 as a protective layer is formed over (below) the recording layer 2. Read light $L_0$ becomes incident on and is reflected by the recording layer 2 from the side of the other (top) surface $1b$ of the substrate 1. Thus, the light $L_0$ is transmitted through the substrate 1 covering (above) the track guide grooves $PG_0$. Accordingly, the effective depth of the track guide grooves $PG_0$ becomes $1/n_0$ of $\frac{1}{8}$ the wavelength of the read light, where $n_0$ is the refractive index of the substrate 1.

Tracking servo control is performed by detecting a diffraction signal which is obtained based on the depth of the track guide groove so that a spot scans the track.

In this case, the contrast of the write pit during read operation is slightly degraded by a difference between the effective depth of the track guide grooves $PG_0$ and $\frac{1}{8}$ the wavelength of the read light. However, since the contrast of the recording medium itself upon formation of holes in the thin recording layer 2 is great, such degradation in the contrast of the pit during read operation is negligible.

Another type of recording material such as antimony selenium ($Sb_2Se_3$) or tellurium oxide $TeO_x$ (where $x \div 1$) for high-speed write has recently been proposed. The energy reflection coefficient of this type of recording material is increased by a change in the absorption coefficient when phase transformation from the amorphous phase to the crystal phase is effected upon reception of optical energy.

However, when such a type of recording material is used, the contrast of the recording material itself becomes degraded in comparison with a recording material of melt type as mentioned above, thus resulting in read signals of a low S/N ratio.

OBJECTS AND SUMMARY OF THE INVENTION

The present invention has been made in consideration of this and has for its object to provide a reflection-type optical recording medium which uses a recording material which has an increased energy reflection coefficient for data write, and for which a clear relationship holds between a change in the energy reflection coefficient of the recording material and the depth of track guide grooves in terms of the contrast of a write pit, so that read signals of a high S/N ratio may be obtained.

In order to achieve the above and other objects of the present invention, there is provided a reflection-type optical recording medium of the type described above wherein track guide grooves are formed such that a depth $\phi_0$ thereof given by:

$$\phi_0 = 2 \cdot n \cdot d / \lambda \cdot 2\pi$$

(where n is a refractive index of the medium which covers said track guide grooves and which transmits input/output read light therethrough, d is an actual step of said track guide grooves, and $\lambda$ is a wavelength of the read light) satisfies:

(i) $\sin \phi_0 < 0$ for $\theta_2 - \theta_1 > 0$, and
(ii) $\sin \phi_0 > 0$ for $\theta_2 - \theta_1 < 0$ where $\theta_1$ and $\theta_2$ are phases of reflected read light before and after data write to said recording material which are defined by:

$$r_1 = R_1 \cdot \exp i\theta_1$$

$$r_2 = R_2 \cdot \exp i\theta_2$$

$$R_1 < R_2$$

(where $r_1$ and $r_2$ are complex reflection coefficients before and after data write to said recording material, and $R_1$ and $R_2$ are absolute values of the complex reflection coefficient before and after data write to said recording material.)

According to the present invention, a recording material is used which has an increased energy reflection coefficient of a write portion or a write pit upon data write if the depth $\phi_0$ of the track guide grooves is selected such that $\sin \phi_0 < 0$ when $\theta_2 - \theta_1 < 0$ and the phase is advanced, and $\sin \phi_0 > 0$ when $\theta_2 - \theta_1 < 0$ and the phase is caused to lags. Since such a recording material is used, high-speed recording can be performed while the phase of reflected light of read light from a write pit draws near that of the reflected light from disc portions other than the track guide grooves. For this reason, the contrast of the write pit is improved due to the relationship between changes in the reflection coefficient of the recording material and the depth of the track guide grooves, and read signals with a high S/N ratio can be obtained.

BRIEF DESCRIPTION OF THE DRAWINGS

FIGS. 2A to 11 are views for explaining a reflection-type optical recording medium according to the present invention, in which:

FIG. 2A is a front view of a two-dimensional diffraction object as a model for obtaining an amplitude distribution of reflected light from an objective lens surface.

FIG. 3 is a representation showing a diffracted light distribution of reflected light from an objective lens surface;

FIG. 4 is a graph showing the relationship between the depth $\phi_0$ of the track guide grooves and a peak-to-peak value P—P of a read signal amount H.F. at each predetermined phase difference $\theta$ before and after data write to a recording material;

FIG. 5 is a representation for explaining an equation defining the depth $\phi_0$ of the track guide grooves;

FIG. 8 is a view showing the relationships of phases of read light reflected at respective portions of the disc;

FIG. 9 is a partial sectional view of an optical recording disc along the direction perpendicular to the track guide grooves;

FIG. 10 is a graph showing the relationships between the thickness of the antimony selenium thin film and the energy reflection coefficients $|r_1|^2$ and $|r_2|^2$ and phases $\theta_1$ and $\theta_2$ before and after a write operation to an antimony selenium thin film; and FIG. 11 is a graph showing the relationship between the depth $\phi_0$ of the track guide grooves and the read signal amount H.F. (P—P).

DETAILED DESCRIPTION OF THE PREFERRED EMBODIMENT

Prior to a description of a preferred embodiment of the present invention, the principle of the present invention will first be described and then a practical application thereof will be described.

Regarding the principle of the present invention, with regard to complex reflection coefficients before and after data write, when the shape of a track guide groove and the shape of a write pit are given, the amplitude of reflected light of read light from an objective lens surface can be calculated in accordance with the H. H. Hopkins theory (Journal of Optical Society of America, Vol. 69, No. 1, Jan. 1979, Diffraction theory of laser read-out systems for optical video discs).

Figure 1:
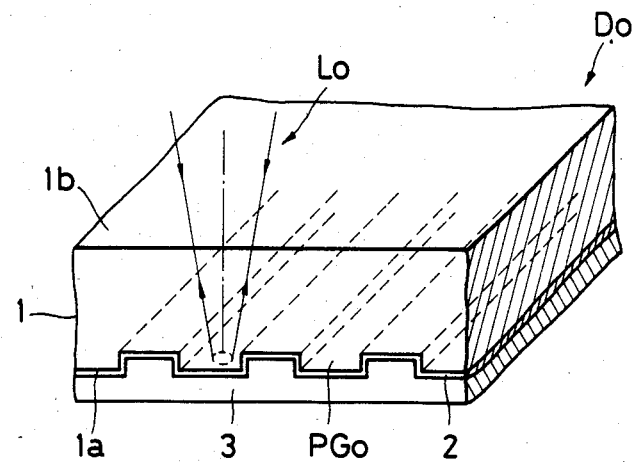
FIG. 1 is a partial, sectional, perspective view of an optical recording disc.
Figure 2A:
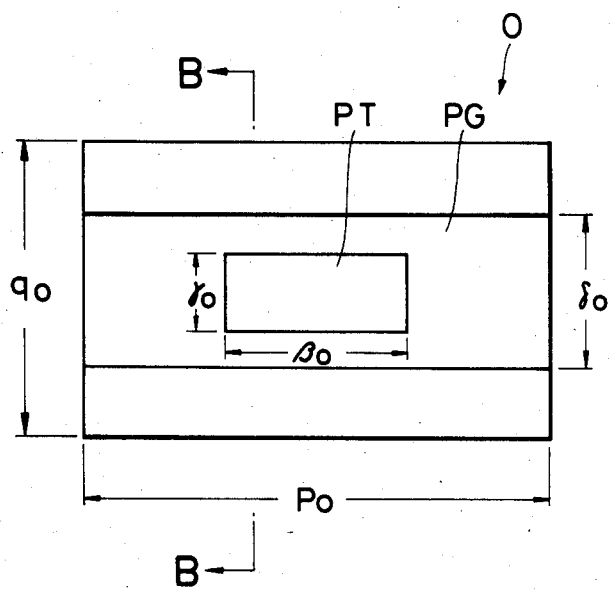
Figure 2B:
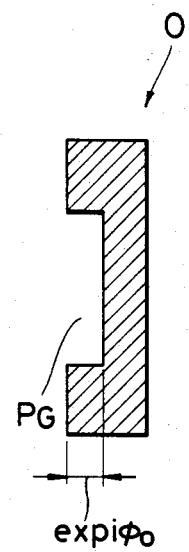
FIG. 2B is a sectional view along the line B—B in FIG. 2A.

Furthermore, a two-dimensional diffraction object O as shown in FIGS. 2A and 2B was considered as a model, which had a length corresponding to a write wavelength $P_0$ (write period on the track) and a width corresponding to a track pitch $q_0$, and which had a track guide groove PG having a width $\delta_0$ and a depth expi$\phi_0$. The track guide groove PG had at its center a write pit PT having a length $\beta_0$ and a width $\gamma_0$. Values of $p_0$, $q_0$, $\beta_0$, $\gamma_0$ and $\delta_0$ are obtained by actual measurement and $\phi_0$ is the depth of the track guide groove PG which may be considered in relation to the wavelength of the read light.

Figure 3:
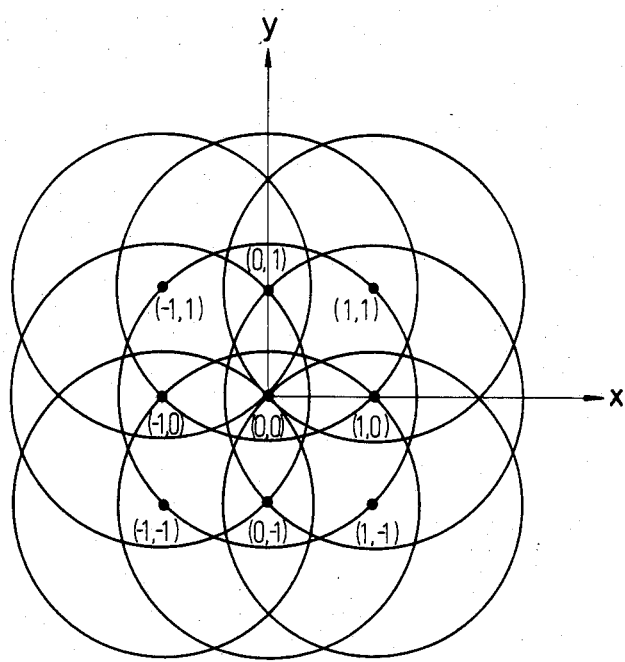

Assume that read light having a wavelength $\lambda$ from a semiconductor laser as a light source is focused in the form of a spot by an objective lens (not shown) and is incident on the two-dimensional diffraction object O in the direction perpendicular to the sheet of the drawing of FIG. 2A. Taking an x-y coordinate system which is perpendicular to the optical axis of reflected light diffracted and incident upon the objective lens surface and has the x-axis as a tracking direction, an (m, n)th diffracted light distribution normalized on the pupil of the lens is formed, as shown in FIG. 3.

An amplitude distribution a(x,y) of reflected light on the objective lens surface, that is, the x-y plane, is given by:

$$a(x,y) = \sum_m \sum_n \exp[-2\pi i\{(m/p)u + (n/q)v\}] \times \quad (1)$$

$$R(m,n) \times f(x - m/p, y - n/q)$$

(a(x,y) = (term of phase shift)×(term of Fourier spectrum of diffracted light determined by shape of write pit PT)×(term of pupil function))

As shown in FIGS. 2A and 2B, when it is assumed that the write pit PT has a rectangular shape and the track guide groove PG also has a rectangular shape, we obtain:

$$R(m,n) = r_1 \cdot \text{SINC}(m) \cdot \text{SINC}(n) +$$

$$r_1 \cdot (\text{expi}\phi_0 - 1) \cdot \delta/q \cdot \text{SINC}(m) \cdot$$

$$\text{SINC}(n \cdot \delta/q) + (r_2 - r_1) \cdot \text{expi}\phi_0 \cdot \beta/p \cdot$$

$$\gamma/\delta \cdot \text{SINC}(m \cdot \beta/p) \cdot \text{SINC}(n \cdot \gamma/\delta)$$

for $p = NA/\lambda \cdot p_0$, $\gamma = NA/\lambda \cdot \gamma_0$, $q = NA/\lambda \cdot q_0$, $\delta = NA/\delta \cdot \delta_0$, and $\beta = NA/\lambda \cdot \beta_0$
wherein
$r_1$ and $r_2$ are complex reflection coefficients of a recording material before and after data write; NA is the numerical aperture of the objective lens; u and v are coordinates representing the deviation of read light from a write pit PT; and SINC x $\equiv$ sin $(\pi x)/\pi x$ is a sync function.

Figure 4:
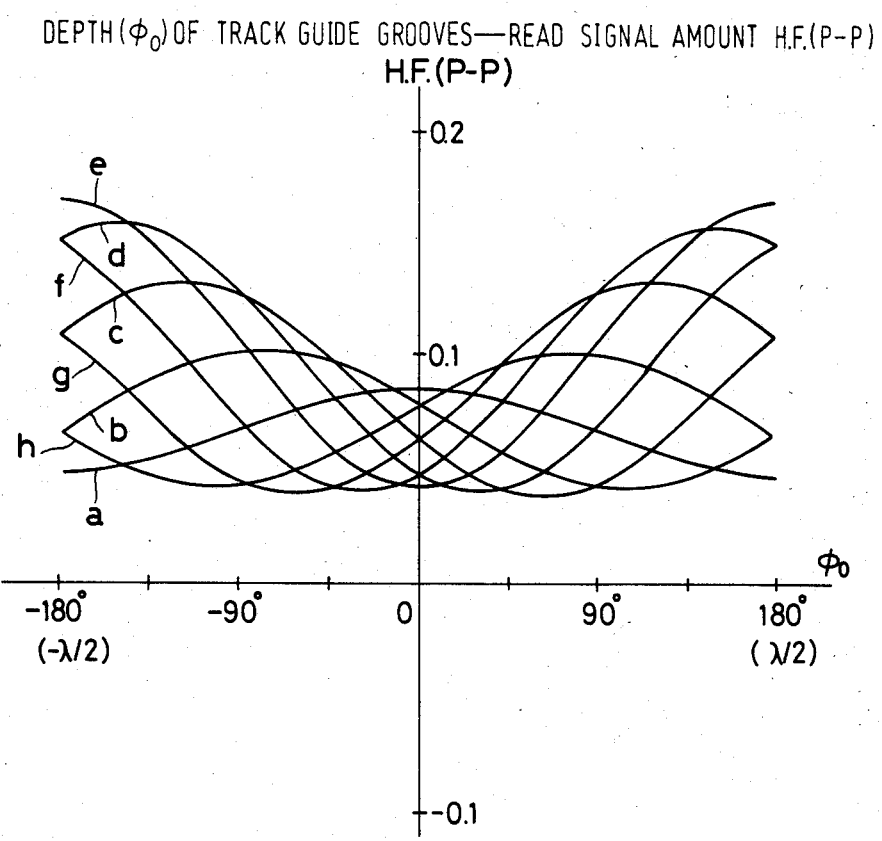

Predetermined values are substituted in the equation (1), and a read signal amount H.F. for giving a P—P (peak-to-peak value) is obtained based on the calculation of the equation (1). Then, a graph as shown in FIG. 4 is obtained showing the relationship between the read signal amount H.F. (P—P) and the depth $\phi_0$ of the track guide groove PG. Note that the read signal amount H.F. (P—P) is obtained by scanning the track guide groove along the tracking direction with a read light spot by a distance corresponding to one write wavelength $p_0$. A description will now be made with reference to FIG. 4.

Curves a to h in FIG. 4 respectively indicate cases wherein
the complex reflection coefficients $r_1$ and $r_2$ of the recording material before and after data write, which are given by:

$$r_1 = R_1 \cdot \text{expi}\phi_1$$

$$r_2 = R_2 \cdot \text{expi}\phi_2$$

where $R_1$ and $R_2$ are absolute values of the complex reflection coefficients of the recording material before and after data write, and $\phi_1$ and $\phi_2$ are phases of reflected read light before and after data write to the recording material, satisfy:

$$|r_1|^2 = 0.1$$

$$|r_2|^2 = 0.3$$

where $|r_1|^2$ and $|r_2|^2$ are the energy reflection coefficients; and the phase difference $\theta$ given by:

$$\theta = \theta_2 - \theta_1$$

is 0° (curve a), 45° (curve b), 90° (curve c), 135° (curve d), 180° (curve e), 225 (−135)° (curve f), 270 (−90)° (curve g), and 315 (−45)° (curve h).

Figure 5:
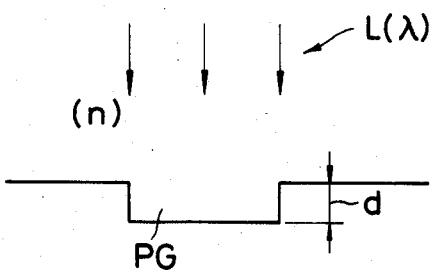

In each of these cases, the depth $\phi_0$ of the track guide groove PG which is given by:

$$\phi_0 = 2 \cdot n \cdot d / \lambda \cdot 2\pi$$

was continuously changed from +180° to −180° (+$\lambda$/2 to −$\lambda$/2) assuming that read light L having a wavelength $\lambda$ is transmitted through a medium having a refractive index n and covering the track guide groove PG, and the spot becomes incident on the track guide groove PG having an actual step d, as shown in FIG. 5.

Other data conditions below were also given:

$$\beta/p = 0.6$$

$$\gamma/q = 0.4$$

$$\delta/q = 0.4$$

Examination of these curves a to h obtained in this manner reveals that the read signal amounts H.F. (P—P) have maximum values at specific values of the depth $\phi_0$ of the track guide grooves PG in accordance with values of the phase difference $\theta$.

Figure 6A:
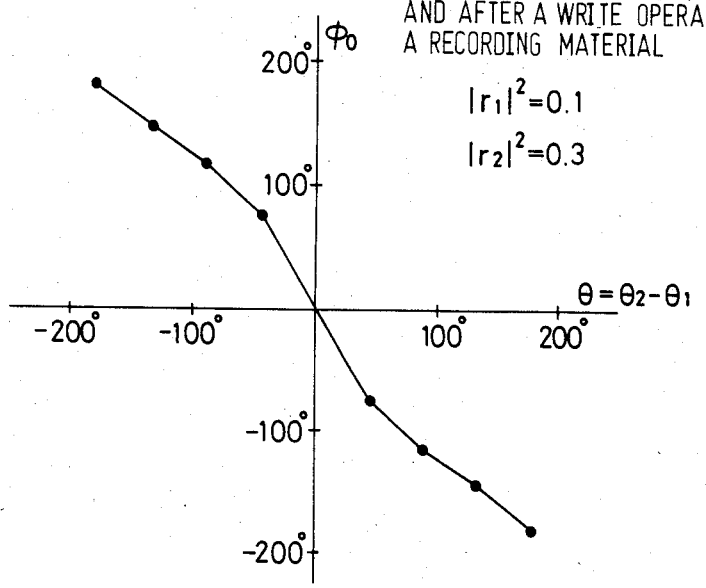
FIGS. 6A and 6B are graphs showing the relationships, under different data conditions, between the predetermined phase difference $\theta$ before and after data write to the recording material and the depth $\phi_0$ of the track guide grooves which provides the maximum value of a read signal amount H.F. (P—P)

FIG. 6A shows a graph obtained based on the curves of the graph shown in FIG. 4, wherein points at which the read signal amounts H.F. (P—P) become maximum are plotted to show a graph representing the relationship between the depth $\phi_0$ of the track guide groove PG and the phase difference $\theta$ at which the read signal amount H.F. (P—P) becomes maximum.

Figure 6B:
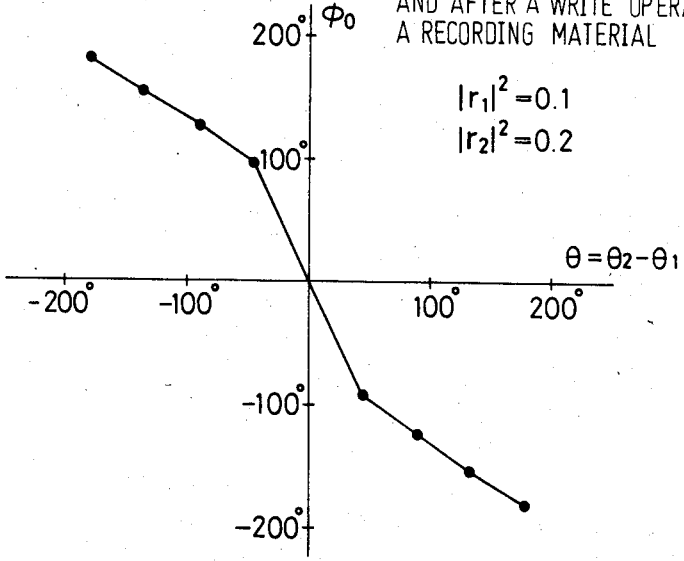

FIG. 6B shows a similar graph obtained under similar conditions except that the following conditions are given:

$$|r_1|^2 = 0.1$$

$$|r_2|^2 = 0.2$$

It is seen from the graphs shown in FIGS. 6A and 6B that, with changes in the complex reflection coefficients $r_1$ and $r_2$ before and after data write to the recording material, when $R_1 < R_2$, that is, when the write portion or the write pit of the recording material has an increased absolute value (energy reflection coefficient) of the complex reflection coefficient, and when $\theta = \theta_2 - \theta_1 > 0$ (when the phase difference is positive and the phase advances), the depth $\phi_0$ of the optimal track guide groove PG < 0; and when $R_1 < R_2$ and when $\theta = \theta_2 - \theta_1 < 0$ (when the phase difference is negative and the phase is lagged), the depth $\phi_0$ of the optimal track guide groove PG > 0.

Figures 7A, 7B:
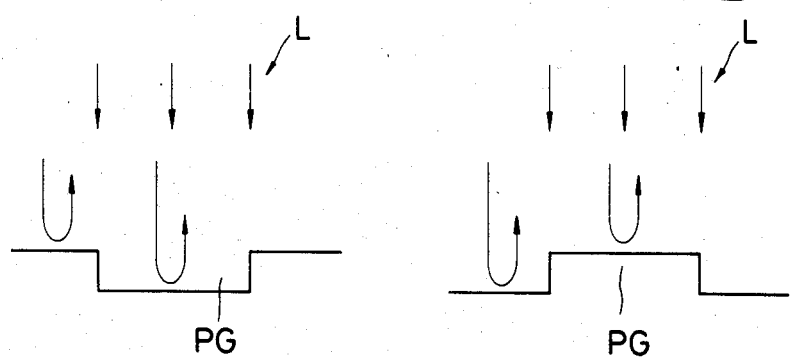
FIGS. 7A and 7B are views illustrating shapes of track guide grooves when the depth $\phi_0$ of the grooves is positive and negative, respectively.

The sign of the depth $\phi_0$ of the track guide groove PG is determined such that the depth $\phi_0$ is negative when the track guide groove PG is recessed when viewed from the side of the read light L as shown in FIG. 7A, and the depth $\phi_0$ is positive when the track guide groove PG is projecting when viewed from the side of the read light L. However, this is applicable only within the ranges of the phase difference $\theta$ and the depth $\phi_0$ as given below:

$$-180° \leq \theta = \theta_2 - \theta_1 \leq 180°$$

$$-180° \leq \phi_0 \leq 180°$$

When $|\phi_0| > 180°$, if $\theta = \theta_2 - \theta_1 > 0$, then sin $\phi_0 < 0$, and if $\theta = \theta_2 - \theta_1 < 0$, then sin $\phi_0 > 0$. This also applies when $|\phi_0| \leq 180°$.

Figure 8:
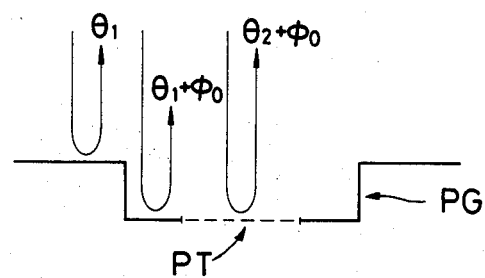

FIG. 8 shows the relationship between the phases of read light reflected at respective portions of an optical recording disc. If the phase difference $\theta$ and the depth $\phi_0$ of the track guide groove PG hold the relationship as described above, a phase ($\theta_2 + \phi_0$) of read light reflected from a write pit PT draws near a phase $\theta_1$ of the reflected light from a disc portion other than the track guide groove PG, and the contrast of the write pit PT is improved.

The present invention will now be described with reference to the particular embodiment thereof.

Figure 9:
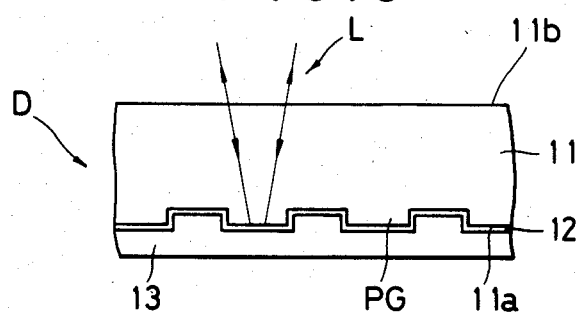

FIG. 9 shows an optical recording disc D as an example of a reflection-type optical recording medium which uses antimony selenium $Sb_2Se_3$.

A thin recording layer 12 of antimony selenium $Sb_2Se_3$ is deposited on one surface 11a of a substrate 11 of an acrylic resin on which track guide grooves PG are formed. A bismuth tellurium layer 13 as a protective layer is formed to cover the recording layer 12. Read light L becomes incident on the recording layer 12 from above through the substrate 11. Thus, the substrate 11 serves as a medium covering the track guide grooves PG and having a refractive index n through which input/output light is transmitted.

Figure 10:
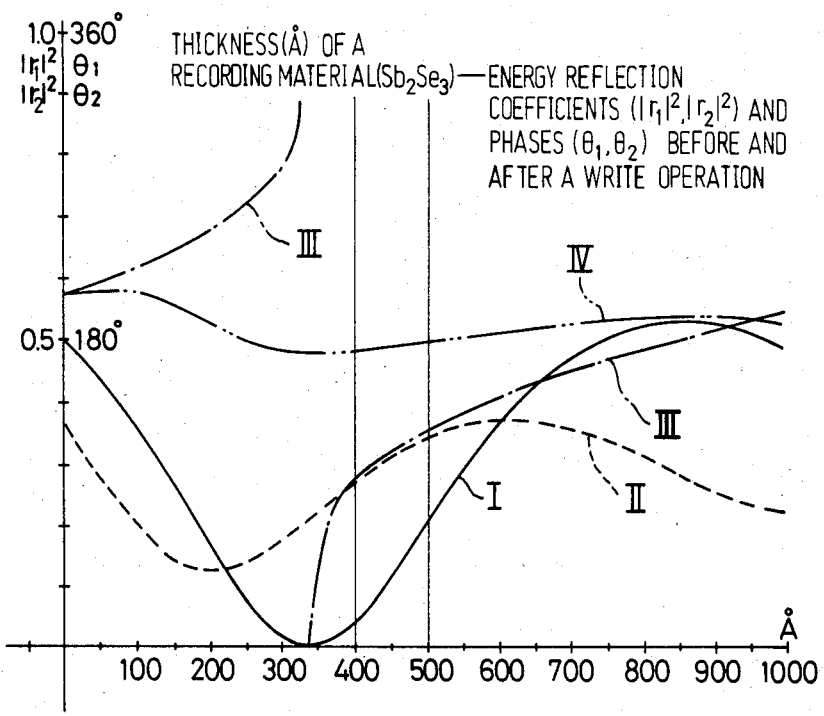

The thickness of the recording layer 12 of antimony selenium $Sb_2Se_3$ as a recording material was varied in the optical recording disc D having such a configuration, and refractive index and the like before and after data write, that is, for a data write portion or a write pit and for other portions of the disc, respectively, were measured. Based on the measurements obtained, the energy reflection coefficients $|r_1|^2$ and $|r_2|^2$ and the phases $\theta_1$ and $\theta_2$ were calculated and were plotted in a graph as shown in FIG. 10. With changes in the thickness of the recording layer 12 of antimony selenium $Sb_2Se_3$, the energy reflection coefficients (curve I = the energy reflection coefficient $|r_1|^2$ before data write; curve II = the energy reflection coefficient $|r_2|^2$ after data write), and the phases (curve III = the phase $\theta_1$ before data write; curve IV = the phase $\theta_2$ after data write) change as shown in the graph in FIG. 10. It is seen from FIG. 10 that the optimal thickness of the recording layer 12 of antimony selenium $Sb_2Se_3$ is preferably selected to fall within the range between 400 Å and 500 Å.

When the thickness of the recording layer 12 falls within this range, the energy reflection coefficients of the recording material before and after data write are given by:

$$|r_1|^2 \simeq 0.1$$

$$|r_2|^2 \simeq 0.3$$

and the phase difference $\theta$ before and after data write is given by:

$$\theta = \theta_2 - \theta_1 \simeq 80°$$

is positive and the phase is advanced.

Figure 11:
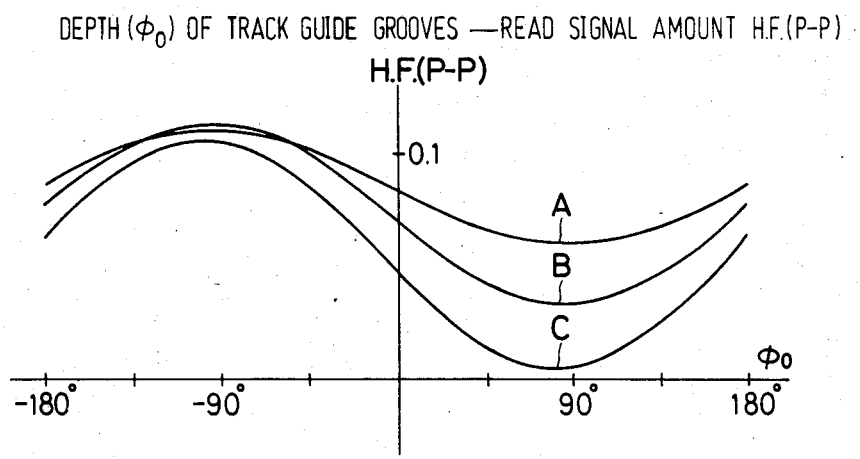

The read signal amount H.F. (P—P) was measured for different values of the depth $\phi_0$ of the track guide groove PG when the thickness of the recording layer 12 of antimony selenium $Sb_2Se_3$ was 400 Å (curve A), 450 Å (curve B) and 500 Å (curve C), respectively. A graph as shown in FIG. 11 was obtained.

It is seen from this graph that when antimony selenium $Sb_2Se_3$ is used as a recording material, the optimal depth $\phi_0$ of the track guide groove PG which gives a maximum read signal amount H.F. (P—P) is $$\phi_0 \doteq -90°.$$

A reflection-type optical recording medium of the present invention can be an optical recording card, an optical recording sheet or the like instead of an optical recording disc. Furthermore, the recording material need not be formed on the entire surface of a a disc in which track guide grooves are formed and need only be formed on the portion of such a surface on which read light becomes incident. Read light may become directly incident on a recording material from the air or the like without the intermediacy of a substrate.

The term "before and after data write to the recording material" used herein refers to a portion of the recording material in which data is not written and a portion of the recording material in which data is written, that is, a write pit.

What is claimed is:

1. A reflection-type optical recording medium having, on a surface thereof on which track guide grooves are formed, a layer of a recording material which has an increased energy reflection coefficient data is written therein, wherein the track guide grooves are formed such that a depth $\phi_0$ thereof given by:

$$\phi_0 = 2 \cdot n \cdot d / \lambda \cdot 2\pi$$

(where n is a refractive index of the medium which covers said track guide grooves and which transmits input/output read light therethrough, d is an actual step of said track guide grooves, and $\lambda$ is a wavelength of the read light) satisfies:

(i) $\sin \phi_0 < 0$ for $\theta_2 - \theta_1 > 0$, or
(ii) $\sin \phi_0 > 0$ for $\theta_2 - \theta_1 < 0$ where $\theta_1$ is the phase of the reflected light before data is written on the recording material $\theta_2$ is the phase of the reflected read light after data has been written on said recording material and which are defined by the equations:

$$r_1 = R_1 \exp i\theta_1$$

$$r_2 = R_2 \exp i\theta_2$$

$$R_1 < R_2$$

(where $r_1$ is a complex reflection coefficient before data has been written on said recording material and $r_2$ is a complex reflection coefficient after data has been written on said recording material, and $R_1$ is an absolute value of the complex reflection coefficient before data has been written on said recording material and $R_2$ is an absolute value of the complex reflection coefficient after data has been written on said recording material).

2. An optical recording medium according to claim 1, wherein said recording material is a member selected from the group consisting of antimony selenium I($Sb_2Se_3$) and tellurium oxide ($TeO_x$; where $x \doteq 1$).

* * * * *